US012641103B2

(12) United States Patent
Navarrete Discua et al.

(10) Patent No.: US 12,641,103 B2
(45) Date of Patent: May 26, 2026

(54) DETECTING BOT AND C2 ACTIVITY VIA WEB APPLICATION NETWORK TRAFFIC

(71) Applicant: Palo Alto Networks, Inc., Santa Clara, CA (US)

(72) Inventors: Christian Elihu Navarrete Discua, San Jose, CA (US); Yanhui Jia, San Jose, CA (US); Taojie Wang, San Jose, CA (US); Shengming Xu, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 101 days.

(21) Appl. No.: 18/592,426

(22) Filed: Feb. 29, 2024

(65) Prior Publication Data

US 2025/0280017 A1 Sep. 4, 2025

(51) Int. Cl.
*G06F 21/00* (2013.01)
*H04L 9/40* (2022.01)

(52) U.S. Cl.
CPC ...... *H04L 63/1425* (2013.01); *H04L 63/0236* (2013.01); *H04L 63/1416* (2013.01)

(58) Field of Classification Search
CPC ............. H04L 63/1425; H04L 63/0236; H04L 63/1416
See application file for complete search history.

(56) References Cited

U.S. PATENT DOCUMENTS 8,204,984 B1 * 6/2012 Aziz ................... H04L 63/0227
709/224
8,578,493 B1 11/2013 Cowan et al.

2015/0058916 A1 * 2/2015 Rostami-Hesarsorkh ..................
H04L 63/168
726/1
2016/0156644 A1 * 6/2016 Wang .................. H04L 63/1425
726/23
2016/0381070 A1 * 12/2016 Zhang ................. H04L 63/1466
726/23

(Continued)

OTHER PUBLICATIONS

Ghafir, et al., "A Survey on Botnet Command and Control Traffic Detection", International Journal of Advances in Computer Networks and Its Security—IJCNS, vol. 5: Issue 2, Oct. 30, 2015, 7 pages.

*Primary Examiner* — Michael M Lee
(74) *Attorney, Agent, or Firm* — Gilliam IP PLLC

(57) ABSTRACT

A service detects bot activity or malicious C2 activity based on data known to be associated with bot and C2 activity for supported web applications and that can be identified from network traffic corresponding to the web application for multiple communication protocols. Such data can include API endpoints known to be associated with C2 activity, malicious users/accounts associated with the web application, and malicious activity patterns. Whether the detection service can detect bot activity that may potentially correspond to C2 activity or malicious C2 activity itself is dependent on whether the obtained network traffic data are decrypted. When network traffic data are encrypted, detection service can detect bot activity by analyzing DNS and SSL/TLS traffic. When network traffic data are decrypted, the detection service can obtain the decrypted network traffic data comprising HTTP traffic and perform further analysis for detection of C2 activity reflected in HTTP traffic.

20 Claims, 7 Drawing Sheets

(56) References Cited

U.S. PATENT DOCUMENTS

| 2020/0104511 | A1* | 4/2020 | Stolfo | H04L 67/535 |
| 2022/0247788 | A1* | 8/2022 | Subbanna | G06F 9/451 |

* cited by examiner

DETECTING BOT AND C2 ACTIVITY VIA WEB APPLICATION NETWORK TRAFFIC

BACKGROUND

The disclosure generally relates to security arrangements for protecting computers, components thereof, programs, or data against unauthorized activity (e.g., CPC subclass G06F 21/00) and to network architectures or network communication protocols for network security (e.g., CPC subclass H04L 63/00).

In cybersecurity, command-and-control, commonly abbreviated as C2 or C&C, is a technique used by malicious actors to communicate with compromised devices over a network. C2 attacks are attacks carried out by malicious actors through C2. With a C2 attack, a server of the malicious actor, or a C2 server, communicates instructions to compromised devices to perform various malicious tasks, thus gaining control over those devices. C2 attacks can result in the creation of botnets, or a network of compromised devices under the control of the malicious actor via the C2 server. C2 beaconing refers to the communication initiated by a compromised device to the C2 server to check for instructions. Beaconing is often performed on frequently used ports and protocols, such as Hypertext Transfer Protocol (HTTP) or HTTP Secure (HTTPS) on their respective ports 80 and 443, which poses a challenge for detection of C2 attacks due to the ease of conflation of malicious C2 traffic with normal, benign network traffic.

BRIEF DESCRIPTION OF THE DRAWINGS

Embodiments of the disclosure may be better understood by referencing the accompanying drawings.

DESCRIPTION

Figure 1:
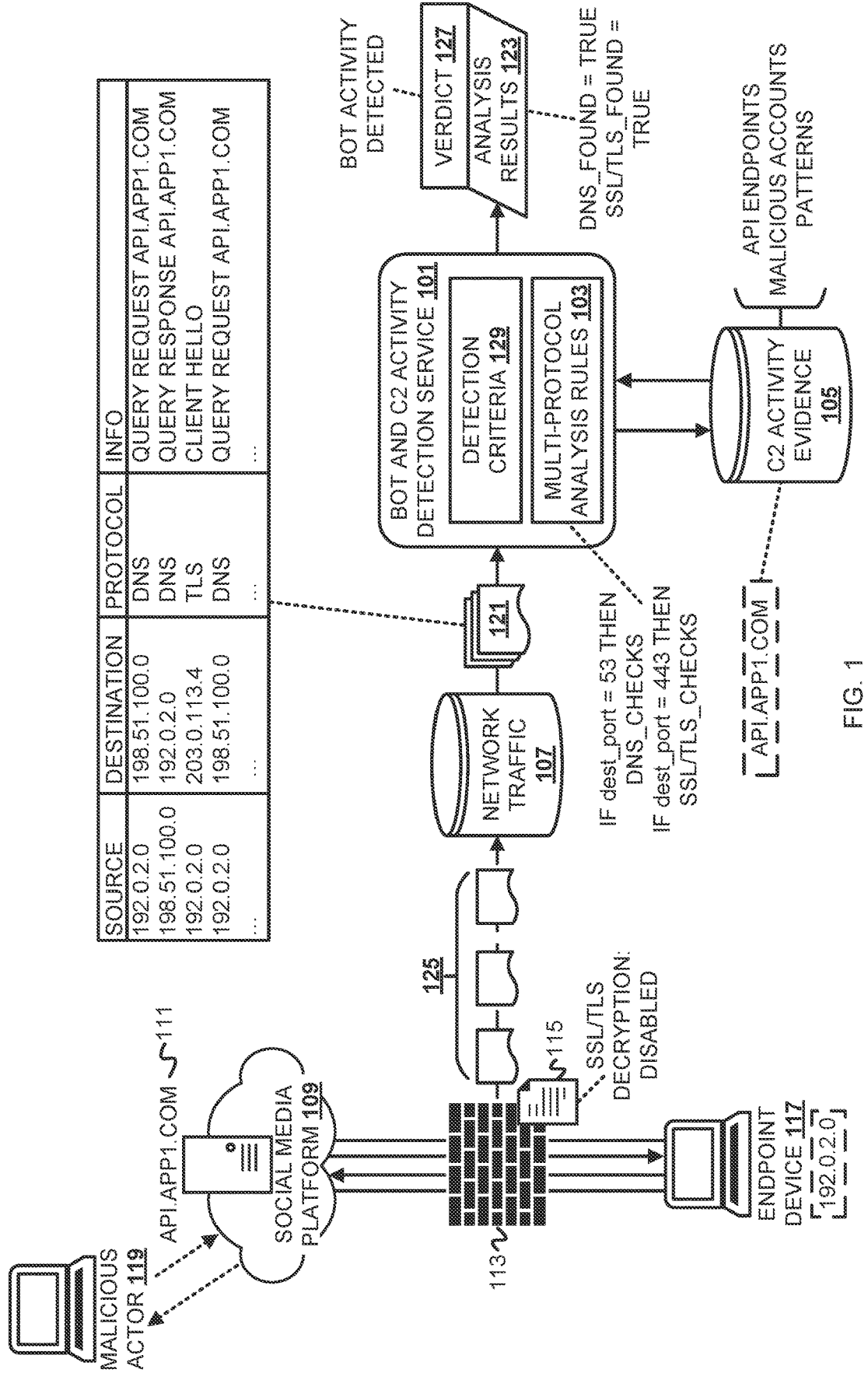
FIG. 1 depicts a conceptual diagram of detecting bot activity based on encrypted network traffic of a social media platform.

The description that follows includes example systems, methods, techniques, and program flows to aid in understanding the disclosure and not to limit claim scope. Well-known instruction instances, protocols, structures, and techniques have not been shown in detail for conciseness.

Terminology

This description uses shorthand terms related to cloud technology for efficiency and ease of explanation. When referring to "a cloud," this description is referring to the resources of a cloud service provider (CSP). For instance, a cloud can encompass the servers, virtual machines, and storage devices of a CSP. In more general terms, a CSP resource (or simply "cloud resource") accessible to customers is a resource owned/managed by the CSP entity that is accessible via network connections. Often, the access is in accordance with an application programming interface (API) or software development kit provided by the CSP.

This description refers to social media platforms. Social media platforms, also referred to as social networking platforms, broadly encompass Internet-accessible applications that provide for communication and/or sharing of data between and among users and the infrastructure on which the applications run. Examples of functionality offered by social media platforms include instant messaging services and content sharing services (e.g., photo and/or video sharing), among others.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

Attackers have begun utilizing infrastructure of web applications such as social media platforms to carry out C2 attacks, which allows them to further hide their presence behind a generally trusted, known entity. A detection service disclosed herein can detect bot activity and malicious C2 activity itself in hosts connected to a network from network traffic sent to and from web applications across multiple communication protocols, such as from Domain Name System (DNS) traffic, Secure Sockets Layer (SSL)/Transport Layer Security (TLS) traffic, and/or HTTP traffic. Detection of bot activity or malicious C2 activity is performed based on data known to be associated with bot and C2 activity for each supported web application and that can be identified from network traffic of the supported protocols. Such data can include API endpoints known to be associated with C2 activity, malicious users and/or accounts associated with the web application, and suspicious patterns, such as those indicative of data exfiltration. These data are curated based on expert knowledge and/or by crawlers deployed to various data sources.

Whether the detection service can detect bot activity that may be reflective of potential C2 activity or C2 activity itself is dependent on whether the network traffic data being analyzed are decrypted, which may be based on whether a cybersecurity device that monitors and logs the network traffic ingested by the detection service has decryption enabled (e.g., SSL/TLS decryption). When network traffic data that the detection service obtains are encrypted, the detection service can detect bot activity by analyzing DNS traffic and SSL/TLS traffic; in this case, the detection of bot activity can be indicative of C2 activity, though the intent of the bot activity remains unconfirmed due to the lack of "visibility" into the encrypted network traffic data. When network traffic data that the detection service obtains are decrypted, HTTP traffic data are obtained in addition to the network traffic data of other communication protocols (e.g., DNS and SSL/TLS). Because the decrypted content are visible and able to be analyzed in this scenario, the detection service can perform further analysis for detection of C2 activity reflected in HTTP traffic. Hosts for which bot activity and/or malicious C2 activity are detected can be quarantined to prevent spreading of the threat through the network.

Example Illustrations

FIG. 1 depicts a conceptual diagram of detecting bot activity based on encrypted network traffic of a social media platform. A malicious actor 119 is assumed to be carrying out malicious activity (e.g., a C2 attack) via infrastructure of a social media platform 109, which is the Telegram™ messaging application in this example. API endpoints and bot detection rules are given for network traffic associated with Telegram in this example, though implementations can perform bot activity detection for other web applications and social media platforms. The social media platform 109 has an API endpoint 111, given as "API.APP1.COM" as an example, that corresponds to a server of the social media platform 109.

A firewall 113 intercepts and inspects network traffic sent to and from an endpoint device ("the device") 117. While not depicted in FIG. 1 for simplicity, the firewall 113 can secure a network to which the device 117 is connected and can be a hardware/physical firewall or virtual (e.g., cloud-based) firewall. The firewall 113 has a configuration 115 installed thereon indicating that SSL/TLS decryption of network traffic is disabled. In this example, SSL/TLS decryption of network traffic is a feature of the firewall 113 that can be enabled or disabled according to the configuration 115. In other examples, the firewall simply may not be equipped with SSL/TLS decryption capabilities (e.g., the firewall does not have a key for decryption). The firewall 113 does not decrypt network traffic as part of network traffic inspection or logging.

Network traffic received by the firewall 113 is mirrored such that data of detected network traffic are sent to and stored in a network traffic repository ("repository") 107. For instance, the configuration 115 may enable network traffic mirroring for network interfaces of the firewall 113. The repository 107 may be a database or other data store offered as a CSP service that "ingests" the data of network traffic mirrored by the firewall 113. This example depicts network traffic data 125 that are transmitted from the firewall 113 to the repository 107 for storage therein. Transmission of network traffic data from the firewall 113 to the repository 107 can occur periodically, such as according to a schedule. The network traffic data 125 can be comprised of one or more packet capture files (e.g., PCAP formatted files). Because the firewall 113 does not perform SSL/TLS decryption due to disabling of the feature in the configuration 115, the network traffic data 125 comprise data of encrypted network traffic. In this example, network traffic data maintained in the repository 107 that were mirrored from the firewall 113 are assumed to at least comprise DNS and SSL/TLS network traffic.

FIG. 1 also depicts a bot and C2 activity detection service ("the detection service") 101. The detection service 101 periodically (e.g., according to a schedule, such as in scheduled batch jobs) retrieves network traffic data from the repository 107 for analysis. In this example, the detection service 101 analyzes the network traffic data retrieved from the repository 107 based on multi-protocol analysis rules ("rules") 103 to determine if the endpoint device(s) for which network traffic was captured is exhibiting bot activity and is thus potentially being controlled by a malicious entity.

The rules 103 comprise rules for analyzing network traffic data of multiple communication protocols that can be identified from encrypted network traffic data, which are DNS and SSL/TLS in this example. The rules 103 are defined for the social media platform 109. For instance, the detection service 101 can be configured with a plurality of rules sets defined for a corresponding plurality of web applications, which includes the rules 103 defined for the social media platform 109. In this case, the detection service 101 determines the web application to which network traffic data being analyzed correspond so the respective rules can be applied. The determination of the web application to which network traffic data correspond may be based on application identifiers associated with detected network traffic that the detection service 101 identifies therein.

With reference to this example, the detection service 101 obtains network traffic data 121 from the repository 107. The network traffic data 121 comprise multi-session, multi-protocol network traffic data. The network traffic data 121 may comprise network traffic data obtained for a designated time window, such as the network traffic data stored in the repository 107 in the last 30 minutes, last hour, etc. For simplicity and to aid in illustration, this example assumes that the network traffic data 121 comprise TLS and DNS traffic data corresponding to communications between the device 117 and the social media platform 109. In particular, the network traffic data 121 comprise DNS traffic data captured for communications between Internet Protocol (IP) addresses 192.0.2.0 and 198.51.100.0 (with the former assumed to correspond to the compromised device 117) and TLS traffic data captured for communications between the IP address of the device 117, or 192.0.2.0, and the IP address 203.0.113.4. In implementations, network traffic data obtained by the detection service 101 can comprise network traffic data captured for multiple communication sessions between multiple different endpoints (e.g., SSL/TLS and DNS sessions established between multiple respective client devices and the social media platform 109). In this scenario, the detection service 101 can determine the sessions corresponding to each distinct endpoint device based on the IP addresses indicated in the network traffic data (e.g., based on determining the sessions that indicate a common IP address as a source/destination address).

The detection service 101 evaluates the network traffic data 121 based on the rules 103 to determine if the network traffic data 121 are indicative of bot activity for the corresponding endpoint device (i.e., the device 117). The detection service 101 determines the protocol(s) to which the network traffic data 121 correspond and applies the respective ones of the rules 103 accordingly. As is the case in this example, the determination of the protocol(s) can be based on a destination port(s) indicated in the network traffic data 121, such as based on standard ports associated with communication protocols (e.g., 53 for DNS, 443 for HTTPS and thus TLS/SSL, etc.). The detection service 101 also has access to at least a first repository 105 of C2 activity evidence that it leverages for evaluation of the network traffic data. While depicted as housed in the repository 105 in this example for clarity, C2 activity evidence can be maintained in multiple databases or data stores that are accessible to the detection service 101. C2 activity evidence include API endpoints of web applications and social media platforms known to be associated with C2 activity (e.g., uniform resource locators (URLs) and/or IP addresses of known API endpoints), indications of accounts (e.g., account names/user identifiers) that are known to be malicious, and/or suspicious patterns. For instance, regular expressions can be maintained in the repository 105 and leveraged for identifying suspicious patterns, where text that matches a regular expression is considered to comprise a malicious pattern. The repository 105 is populated offline by web crawlers, by domain experts with access to domain knowledge, etc.

As an example, a first of the rules 103 defined for DNS traffic data may indicate that DNS traffic data are indicative of bot activity if the DNS traffic data comprise a DNS response that indicates an API endpoint that is maintained in the repository 105. To evaluate the network traffic data 121 based on this rule, the detection service 101 determines if the network traffic data 121 comprise at least a first DNS response, identifies the resource indicated in the query response(s), and queries the repository 105 to determine if the resource(s) matches an API endpoint maintained in the repository 105. The rule defined for DNS traffic can specify one or more DNS response header flags so that the detection service 101 can identify the DNS response(s) to check based on the presence of the designated flag(s). The DNS response header flag(s) may be represented with bytes, for example. The rule defined for DNS traffic may also indicate a check performed for the bytes of the DNS response to determine if the DNS traffic comprises at least a designated number of bytes and/or messages, where the DNS traffic data is determined to be indicative of bot activity if the byte/message count satisfies this check.

In this example, the detection service 101 determines that the network traffic data 121 comprises a DNS response that indicates the API endpoint 111, and the API endpoint 111 is also indicated in the repository 105. The detection service identifies the API endpoint 111 from the DNS response, queries the repository 105 for the API endpoint 111, and determines that the API endpoint indicated in the DNS response thus has a match in the repository 105. As a result, the detection service 101 determines that the network traffic data 121 satisfy the one of the rules 103 defined for DNS traffic data. The detection service 101 generates analysis results 123 and indicates therein that the network traffic data 121 comprise evidence of bot activity for the subset of DNS traffic data (e.g., by setting a flag, incrementing a counter, etc.). FIG. 1 depicts the detection service as setting a flag name "DNS_FOUND" to true in the analysis results 123.

As another example, a second of the rules 103 defined for SSL/TLS traffic data may indicate that SSL/TLS traffic data are indicative of bot activity if the SSL/TLS traffic data comprise a "client hello" message that has a value of the server name indication (SNI) field present that matches one of the known API endpoints maintained in the repository 105. This example assumes that the detection service 101 determines that the network traffic data 121 satisfy the ones of the rules 103 defined for SSL/TLS traffic data. The detection service indicates in the analysis results 123 that the network traffic data 121 comprise evidence of bot activity for the subset of TLS traffic data (e.g., by setting a flag, incrementing a counter, etc.). FIG. 1 depicts the detection service as setting a flag named "SSL/TLS_FOUND" to true in the analysis results 123.

The detection service 101 determines based on the analysis results 123 whether the network traffic data 121 comprise sufficient evidence of bot activity and bot activity can thus be detected for the associated device (i.e., the device 117). The detection service 101 evaluates the analysis results 123 based on detection criteria 129 that comprise one or more criteria for detecting bot activity based on results of multi-protocol analysis of network traffic. For instance, the detection criteria 129 may indicate that bot activity should be detected if analysis results indicate that the rules 103 were satisfied, such as based on whether the associated flags, counters, etc. for each of the rules 103 indicate that the corresponding rule was satisfied. As an illustrative example, the detection criteria 129 can indicate that bot activity should be detected if the flags for both "DNS_FOUND" and "SSL/TLS_FOUND" are set to true in the analysis results being evaluated. As depicted in FIG. 1, the analysis results 123 indicate that the flags for "DNS_FOUND" and "SSL/TLS_FOUND" are set to true. The detection service 101 thus determines that the network traffic data are indicative of bot activity and generates a verdict 127 that bot activity was detected for the device 117 accordingly. The verdict 127 may indicate that the device 117 is potentially compromised due to the detection of bot activity for the device 117, though further determination of whether the bot is used maliciously for a C2 attack is not made due to the encryption of the network traffic data 121 reducing "visibility" into the nature of the activities reflected in the captured network traffic.

The detection service 101 indicates the analysis results 123 and the verdict 127, such as by generating a report or notification comprising the analysis results 123 and the verdict 127, displaying the report or notification (e.g., on a graphical user interface (GUI)), etc. The analysis results 123 and the verdict 127 can indicate the device 117, such as by a device identifier and/or network address (e.g., IP address). Action can thus be taken for the device 117 to secure the associated network being secured by the firewall 113. As an example, the detection service 101 can present the analysis results 123 and the verdict 127 on a GUI with a selectable option to quarantine the device 117. Upon selection of this option (e.g., by a network/security administrator), steps can be taken to quarantine the device 117.

Figure 2:
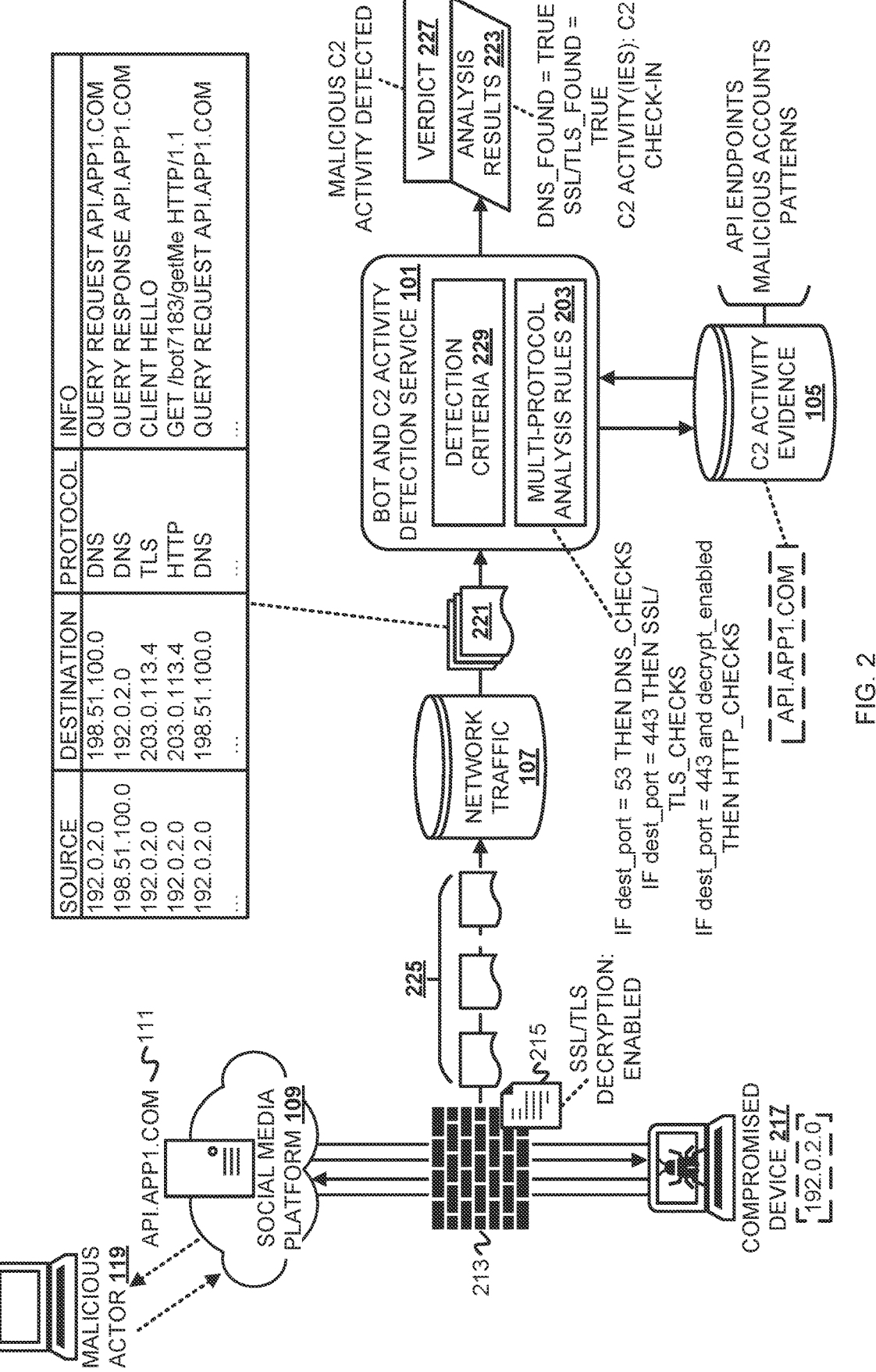
FIG. 2 depicts a conceptual diagram of detecting malicious C2 activity based on decrypted network traffic of a social media platform.

FIG. 2 depicts a conceptual diagram of detecting malicious C2 activity based on decrypted network traffic of a social media platform. Similar to the example depicted in FIG. 1, a device 217 is assumed to be compromised (hereinafter "the compromised device 217") and is controlled by the malicious actor 119 carrying out a C2 attack via infrastructure of the social media platform 109. A firewall 213 intercepts and inspects network traffic sent to and from the compromised device 217. Like the firewall 113 of FIG. 1, the firewall 213 can secure a network to which the compromised device 217 is connected and can be a hardware/physical or virtual firewall. The firewall 213 has a configuration 215 installed thereon indicating that SSL/TLS decryption of network traffic is enabled. The firewall 213 thus decrypts network traffic as part of network traffic inspection or logging. Network traffic received by the firewall 213 is also mirrored such that data of detected network traffic are sent to and stored in the repository 107.

This example depicts network traffic data 225 that are transmitted from the firewall 213 to the repository 107 for storage therein. Because the firewall 213 performs SSL/TLS decryption due to enabling of the feature in the configuration 215, the network traffic data 225 comprise data of decrypted network traffic. In this example, network traffic data maintained in the repository 107 that were mirrored from the firewall 213 are assumed to at least comprise DNS, SSL/TLS, and HTTP network traffic.

The detection service 101 obtains network traffic data 221 from the repository 107. Like the network traffic data 121 of FIG. 1, the network traffic data 221 comprise multi-session, multi-protocol network traffic data and may comprise network traffic data obtained for a designated time window. For simplicity and to aid in illustration, this example assumes that the network traffic data 221 comprise TLS, DNS, and HTTP traffic data (as a result of decryption of HTTPS traffic) corresponding to communications between the compromised device 217 and the social media platform 109. In particular, the network traffic data 221 comprise DNS traffic data captured for communications between IP addresses 192.0.2.0 and 198.51.100.0 and HTTPS (i.e., HTTP encrypted with TLS) traffic data captured for communications between IP addresses 192.0.2.0 and 203.0.113.4 (with the IP address 192.0.2.0 again assumed to correspond to the compromised device 217).

The detection service 101 analyzes the network traffic data 221 based on multi-protocol analysis rules ("rules") 203 to determine if the endpoint device(s) for which network traffic was captured is being controlled by a malicious entity as part of a C2 attack. Like the rules 103 described above, the rules 203 comprise rules for analyzing network traffic data of multiple communication protocols that can be identified from encrypted network traffic data, which are DNS and SSL/TLS in this example. These may be the same ones of the rules described in reference to FIG. 1 as the rules 103. The rules 203 also comprise rules for analyzing network traffic data of one or more communication protocols that can be identified from decrypted network traffic data, which is HTTP in this example. While depicted as being configurable with two sets of rules herein, the detection service 101 may be configured with one set of multi-protocol rules that comprises rules for encrypted and decrypted network traffic data, where the detection service 101 determines whether the network traffic data are decrypted as part of determining which of the rules to apply. For instance, with reference to FIG. 1, the rules 103 may also comprise the HTTP rule(s) described in reference to the rules 203 with an added condition that the network traffic data be decrypted in order to apply the HTTP rule(s). Further, some rules can be applied for both encrypted and decrypted network traffic data (e.g., the rules defined for SSL/TLS and DNS), and one or more additional rules can be applied based on determining that the network traffic data are decrypted (e.g., the rules defined for HTTP).

The detection service 101 evaluates the network traffic data 221 based on the rules 203 and the evidence of C2 activity maintained in the repository 105 to determine if the network traffic data 221 are indicative of malicious C2 activity for the corresponding endpoint device (i.e., the compromised device 217). The detection service 101 determines the protocol(s) to which the network traffic data 221 correspond and applies the respective ones of the rules 203 accordingly. As is the case in this example and as described above, the determination of the protocol(s) can be based on a destination port(s) indicated in the network traffic data 221. This example assumes that the rules 203 indicate rules for DNS and SSL/TLS traffic data as described in reference to FIG. 1 and also indicate one or more rules for HTTP traffic data.

Assuming that the rules 203 indicate the rules 103 for DNS and SSL/TLS traffic described in reference to FIG. 1, the detection service 101 analyzes the respective subsets of the network traffic data 221 that correspond to DNS and TLS traffic based on the respective ones of the rules 203. As similarly described above, a first of the rules 203 defined for DNS traffic data may indicate that DNS traffic data are indicative of bot activity if the DNS traffic data comprise a DNS response (e.g., a DNS response that comprises a header flag designated in the rules 203) that indicates an API endpoint that is maintained in the repository 105. The detection service 101 determines that the network traffic data 221 comprises a DNS response that indicates the API endpoint 111, and the API endpoint 111 is also indicated in the repository 105. As a result, the detection service 101 determines that the network traffic data 221 satisfy the one of the rules 203 defined for DNS traffic data. The detection service 101 generates analysis results 223 and indicates therein that the network traffic data 221 comprise evidence of bot activity for the subset of DNS traffic data. FIG. 2 depicts the detection service as setting a flag named "DNS_FOUND" to true in the analysis results 223.

As also similarly described above, a second of the rules 203 defined for SSL/TLS traffic data may indicate that SSL/TLS traffic data are indicative of bot activity if the SSL/TLS traffic data comprise a "client hello" message that has a value of the SNI field present that matches an API endpoint maintained in the repository. The detection service 101 determines in this example that the network traffic data 221 satisfy the ones of the rules 203 defined for SSL/TLS traffic data. The detection service indicates in the analysis results 223 that the network traffic data 221 comprise evidence of bot activity for the subset of TLS traffic data. FIG. 2 depicts the detection service as setting a flag named "SSL/TLS_FOUND" to true in the analysis results 223.

Further, because the network traffic data 221 comprise decrypted network traffic data, the detection service 101 analyzes the respective subset of the network traffic data 221 that corresponds to HTTP traffic data based on the respective one(s) of the rules 203. Because accessing the HTTP traffic data relies on SSL/TLS decryption being performed, the checks based on the rules 203 that the detection service 101 performs for HTTP traffic data can be performed as part of the checks based on the rules 203 performed for the SSL/TLS traffic data. For instance, the rules 203 defined for HTTP traffic data can be defined as a subset of the rules defined for SSL/TLS traffic data that are to be applied if the network traffic data are decrypted. The rules 203 defined for HTTP traffic data can indicate one or more API endpoints or other URL patterns of the social media platform 109 that correspond to known C2 activities. If the detection service 101 identifies one or more of these API endpoints or URL patterns in a URL path of an HTTP request included in the network traffic data 221, the detection service 101 indicates the corresponding C2 activity specified in the rules 203 in the analysis results 223. For the example where the social media platform 109 is Telegram, the rules 203 can indicate that the URL path patterns "*/bot", "*/getMe", "*/getUpdates", and "*/sendMessage" correspond to setting an API key, C2 check-in, C2 beaconing, and C2 communication, respectively. Since the network traffic data 221 comprise an HTTP request with a URL path that matches the pattern defined for C2 check-in, or "*/getMe", the detection service 101 indicates in the analysis results 223 that a C2 check-in was identified in the network traffic data 221. For those of the rules 203 defined for HTTP traffic data that are satisfied, the detection service 101 can set a flag, increment a counter, etc. in the analysis results 223. In this example, the detection service 101 has indicated the C2 check-in identified for the network traffic data 221.

The rules 203 defined for HTTP traffic data can indicate additional rules for matching text identified from HTTP requests/responses to data maintained in the repository 105. For instance, the detection service 101 may determine whether any of the HTTP traffic data of the network traffic data 221 comprise an HTTP response that indicates a user identifier, account name, username, etc. that has a match in the repository 105. As another example, the detection service 101 may maintain or have access to (e.g., in the repository 105) suspicious or known malicious commands, such as those used in injection attacks, and evaluate HTTP requests or responses based on the suspicious or known malicious commands to determine if any are indicated in an HTTP request or response. As another example, the detection service 101 may determine whether any of the HTTP traffic data of the network traffic data 221 comprise an HTTP response that matches to a suspicious or known malicious pattern maintained in the repository 105, such as patterns that may be indicative of a data exfiltration attempt.

The detection service 101 determines based on the analysis results 223 whether the network traffic data 221 comprise sufficient evidence of C2 activity and malicious C2 activity can thus be detected for the associated device (i.e., the compromised device 217). The detection service 101 evaluates the analysis results 223 based on detection criteria 229 that comprise one or more criteria for detecting malicious C2 activity based on results of multi-protocol analysis of network traffic. For instance, the detection criteria 229 may indicate that malicious C2 activity should be detected if analysis results indicate that at least a subset of the rules 203 were satisfied, such as based on whether the associated flag(s), counter(s) indicating that evidence of malicious C2 activity was identified, etc. in the analysis results indicate that the corresponding rule was satisfied. As an illustrative example, the detection criteria 229 can indicate that malicious C2 activity should be detected if the flags for both "DNS_FOUND" and "SSL/TLS_FOUND" are set to true and/or whether evidence of C2 activity was identified from HTTP network traffic data. As depicted in FIG. 2, the analysis results 223 indicate that the flags for "DNS_FOUND" and "SSL/TLS_FOUND" are set to true and a C2 check-in was identified in the network traffic data 221. The detection criteria 229 are thus satisfied, so the detection service 101 determines that the network traffic data 221 are indicative of C2 activity and generates a verdict 227 that malicious C2 activity was detected for the compromised device 217 accordingly.

The detection service 101 indicates the analysis results 223 and the verdict 227, such as by generating a report or notification comprising the analysis results 223 and the verdict 227, displaying the report or notification, etc. The analysis results 223 and the verdict 227 can indicate the compromised device 217, such as by a device identifier and/or network address. Action can thus be taken to secure the compromised device 217 to secure the associated network being secured by the firewall 213. As an example, the detection service 101 can present the analysis results 223 and the verdict 227 on a GUI with a selectable option to quarantine the compromised device 217. Upon selection of this option, steps can be taken to quarantine the compromised device 217.

In contrast to the device 117 of FIG. 1, FIG. 2 depicts the compromised device 217 as being compromised and under the control of the malicious actor 119. This is to emphasize that malicious C2 activity can be confirmed when the detection service 101 can analyze decrypted network traffic data. The device 117 is referred to as "potentially compromised" in FIG. 1 since the presence of C2 activity remains unconfirmed when the detection service 101 does not have access to the decrypted HTTPS traffic data.

Figure 3:
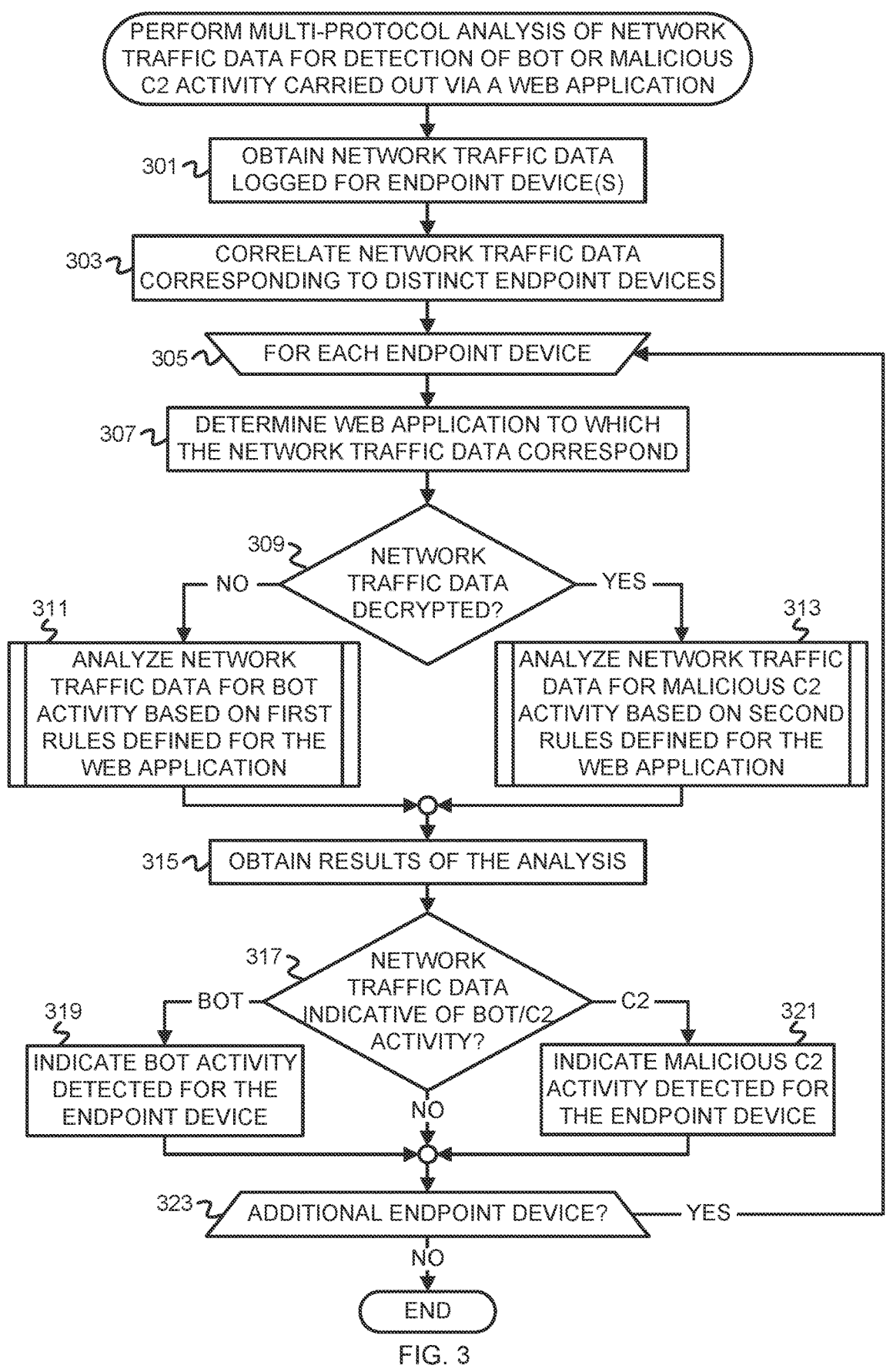
FIG. 3 is a flowchart of example operations for performing multi-protocol analysis of network traffic data for detection of bot or malicious C2 activity carried out via a web application (e.g., a social media platform).
Figure 4:
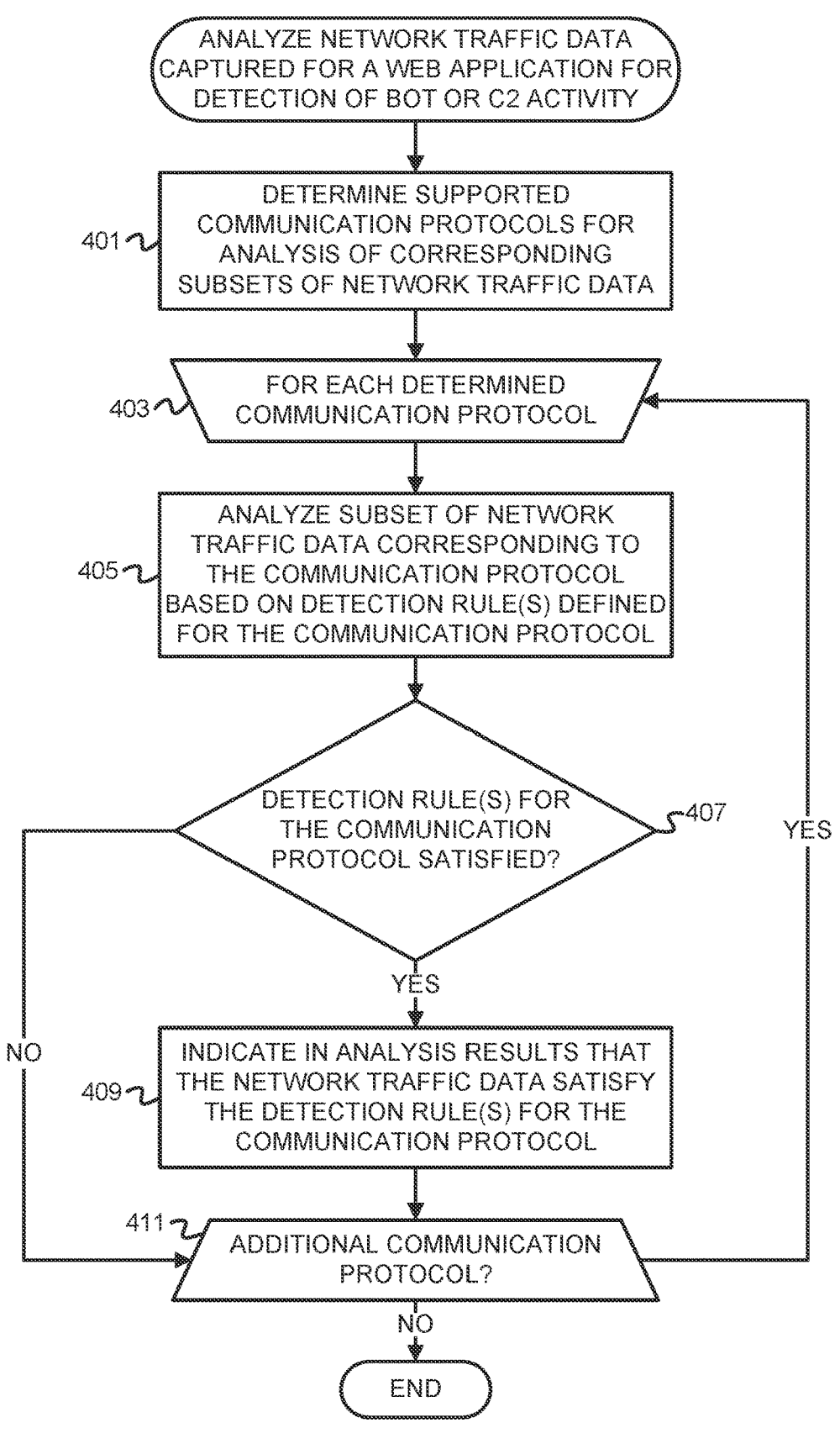
FIG. 4 is a flowchart of example operations for analyzing network traffic data captured for a web application for detection of bot or C2 activity.
Figure 5:
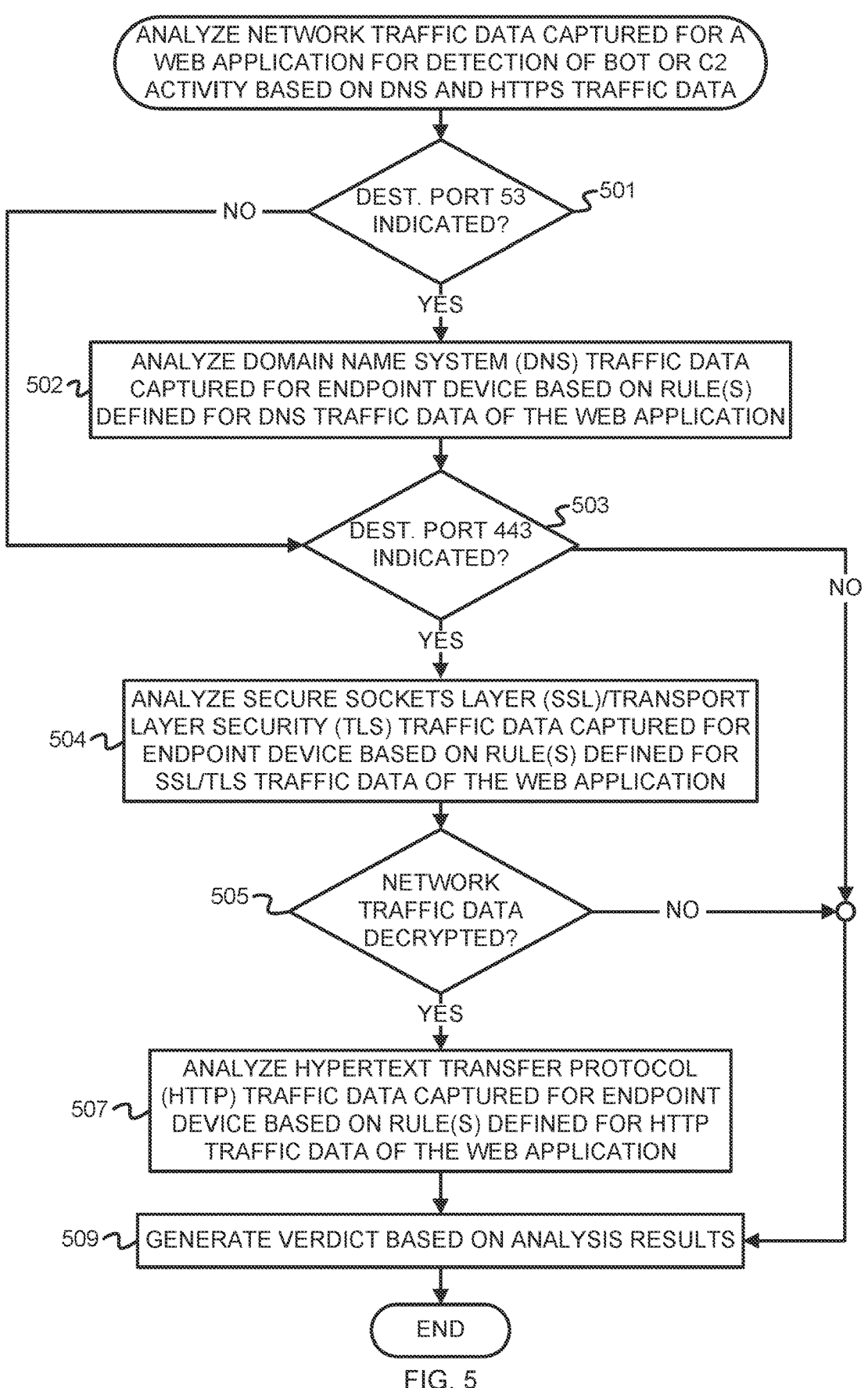
FIG. 5 is a flowchart of operations for analyzing network traffic data captured for a web application for detection of bot or C2 activity based on DNS and HTTPS traffic data.

FIGS. 3-5 are flowcharts of example operations. The example operations are described with reference to a bot and C2 activity detection service (hereinafter "the detection service") for consistency with the earlier figures and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 3 is a flowchart of example operations for performing multi-protocol analysis of network traffic data for detection of bot or malicious C2 activity carried out via a web application (e.g., a social media platform). The example operations assume that rules for detecting bot and/or C2 activity have been defined for one or more web applications, such as one or more social media platforms.

At block 301, the detection service obtains network traffic data logged by a firewall for one or more endpoint devices. The network traffic data may be obtained from a repository of network traffic data mirrored by a cybersecurity device (e.g., a firewall). The detection service can obtain network traffic data corresponding to a designated time window (e.g., the last three days). The network traffic data may be stored in packet capture files.

At block 303, the detection service correlates network traffic data corresponding to distinct endpoint devices. Since the network traffic data can correspond to multiple different communication sessions established between an endpoint device and a server(s) associated with the web application, the detection service correlates the network traffic data so that the network traffic data associated with each individual endpoint device can be analyzed for detection of bot activity or C2 activity for the device. The detection service can determine the network traffic data corresponding to individual endpoint devices based on determining the sessions that have an IP address in common (i.e., sessions with different identifiers but have a source or destination IP address in common), where this IP address corresponds to an endpoint device secured by the firewall.

At block 305, the detection service begins iterating over each endpoint device for which network traffic data were obtained. The detection service analyzes the network traffic data obtained for each endpoint device, which can include network traffic data of multiple communication protocols.

At block 307, the detection service determines the web application to which the network traffic data correspond. The network traffic data should indicate an application determined to correspond to the associated network traffic (e.g., by the cybersecurity device). The web application can be determined based on the identifier of the application that the detection service identifies from the network traffic data.

At block 309, the detection service determines if the network traffic data are decrypted. The detection service can determine if the network traffic data are decrypted based on whether the network traffic data comprise data of a communication protocol that is "visible" with decryption (e.g., HTTP). If the network traffic data are not decrypted (i.e., are encrypted), operations continue at block 311. If the network traffic data are decrypted, operations continue at block 313.

At block 311, the detection service analyzes the network traffic data for bot activity based on first rules defined for the web application. Since the network traffic data are encrypted, the detection service can detect bot activity (or potential C2 activity) in lieu of detecting C2 activity itself. Bot activity can be distinguished from C2 activity in the context of the analysis of network traffic data in that C2 activity can be confirmed from analysis of decrypted network traffic data, while bot activity that may correspond to suspected or potential C2 activity can be detected from encrypted network traffic data. Detected bot activity can be indicative of potential C2 activity that warrants further investigation of the affected endpoint device. The first rules comprise rules defined for the web application and correspond to one or more communication protocols, such as SSL/TLS and DNS. The rules indicate one or more API endpoints, IP addresses, etc. that are known to be associated with the web application and can correspond to bot activity being carried out via that web application. Alternatively, or in addition, the rules can indicate that bot activity should be detected if the network traffic data comprises an API endpoint, IP address, etc. that has a match in a set of known API endpoints/IP addresses that is maintained by or accessible to the detection service (e.g., in a database(s)). Analysis of network traffic data for detection of bot activity is described in further detail in reference to FIG. 4.

At block 313, the detection service analyzes the network traffic data for malicious C2 activity based on second rules defined for the web application. Since the network traffic data are decrypted, the detection service can detect malicious C2 activity from analysis of the network traffic data. The second rules comprise rules defined for the web application and correspond to one or more communication protocols, such as SSL/TLS, DNS, and HTTP. The rules indicate one or more API endpoints, IP addresses, patterns, commands, etc. that are known to be associated with the web application and can correspond to C2 activity being carried out via that web application. Alternatively, or in addition, the rules can indicate that bot activity should be detected if the network traffic data comprises an API endpoint, IP address, username/user identifier, command, pattern, etc. that has a match in a set of known API endpoints, IP address, usernames/user identifiers, commands, and/or patterns that is maintained by or accessible to the detection service (e.g., in a database(s)). Analysis of network traffic data for detection of C2 activity is described in further detail in reference to FIGS. 4-6.

At block 315, the detection service obtains results of the analysis. The results may indicate a verdict as to whether bot activity or C2 activity was detected for the corresponding endpoint device. The results may further indicate additional evidence associated with the verdict, such as one or more C2 activities identified from analysis of the network traffic data (if the network traffic data were decrypted).

At block 317, the detection service determines if the network traffic data are indicative of bot activity or C2 activity. The detection service evaluates the analysis results and determines whether the endpoint device is affected by bot activity or C2 activity. For instance, the results may comprise a verdict indicating that bot activity or C2 activity was detected based on the analysis of the network traffic data obtained for the endpoint device. As another example, the detection service can determine whether the analysis results indicate that the network traffic data satisfied the respective rules and thus are indicative of bot or C2 activity. To illustrate, the detection service may determine that the network traffic data are indicative of bot activity if the analysis results indicate that evidence of bot activity was found for each supported communication protocol (e.g., for DNS and SSL/TLS) or that the network traffic data are indicative of C2 activity if the analysis results indicate that evidence of C2 activity was found for each supported communication protocol and network traffic data were decrypted (i.e., HTTP traffic data were analyzed). Alternatively, or in addition, the determination may be based on whether a value of a counter maintained in the analysis results is nonzero (e.g., was incremented as a result of identifying evidence of malicious C2 activity in HTTP traffic). If the network traffic data are indicative of bot activity, operations continue at block 319. If the network traffic data are indicative of malicious C2 activity, operations continue at block 321. If neither bot activity nor malicious C2 activity are reflected in the network traffic data, operations continue at block 323.

At block 319, the detection service indicates that bot activity was detected for the endpoint device. The detection service may generate a notification, alert, or report that indicates the endpoint device, add the endpoint device to a list of endpoint devices for which bot activity was detected, etc.

At block 321, the detection service indicates that malicious C2 activity was detected for the endpoint device. The detection service may generate a notification, alert, or report that indicates the endpoint device, add the endpoint device to a list of endpoint devices for which malicious C2 activity was detected, etc. The detection service can further indicate any evidence of C2 activity that was identified from the analysis of the corresponding network traffic and included in the analysis results (e.g., a malicious username/user identifier, C2 activity(ies), etc.).

At block 323, the detection service determines if there is an additional endpoint device for which network traffic data were obtained. If there is an additional endpoint device, operations continue at block 305. Otherwise, operations are complete. The detection service may indicate the set of endpoint devices for which bot activity and/or malicious C2 activity was detected, such as by indicating the notification(s), alert(s), report(s) on a GUI. Action can then be taken to remediate or quarantine the affected endpoint device(s).

FIG. 4 is a flowchart of example operations for analyzing network traffic data captured for a web application for detection of bot or C2 activity. The example operations refer to analyzing network traffic data associated with a web application (e.g., a social media platform) corresponding to sessions that comport to multiple respective communication protocols. The example operations assume that the network traffic data captured for communications between an endpoint device and infrastructure of the web application, such as a social media platform, have been obtained (e.g., in one or more packet capture files).

At block 401, the detection service determines the supported communication protocols for analysis of corresponding subsets of the network traffic data. The detection service can determine the supported communication protocols for analyzing the corresponding subsets of the network traffic data based on determining the destination port(s) indicated in the network traffic data. For instance, the detection service can determine that analyses of DNS traffic data and SSL/TLS traffic data are to be performed based on determining that the network traffic data indicate destination ports of 53 and 443, respectively. In this case, the network traffic data thus comprise subsets corresponding to DNS traffic and SSL/TLS traffic. The detection service can determine whether analysis of HTTP traffic data should be performed based on determining that the network traffic data indicate a destination port of 443 (i.e., the standard port for HTTPS) and comprise decrypted HTTP traffic data. This determination may be based on configuration information obtained for the cybersecurity appliance indicating whether SSL/TLS decryption was enabled for the firewall or may be based on searching the network traffic data.

Figure 6:
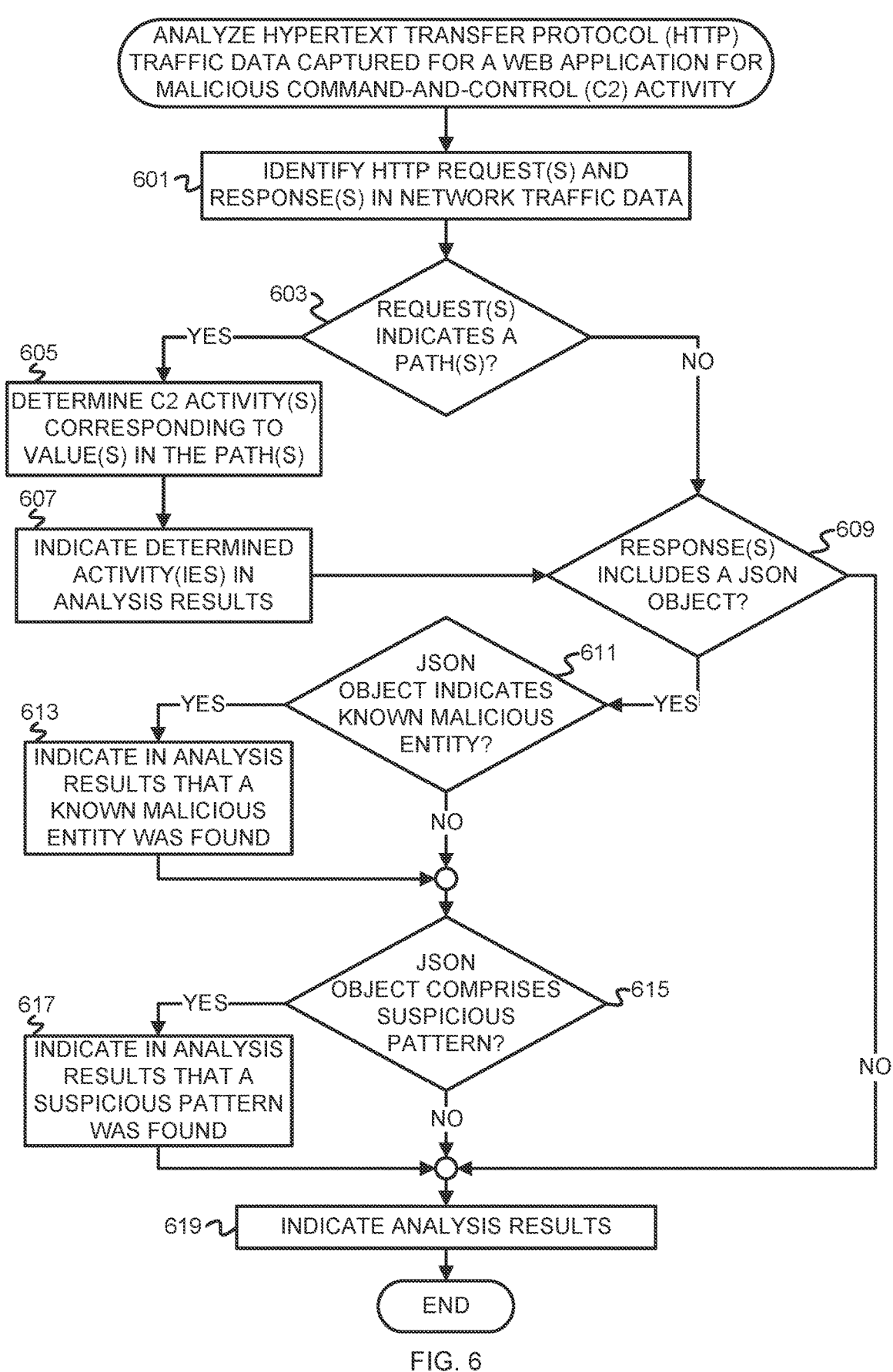
FIG. 6 is a flowchart of example operations for analyzing HTTP traffic data captured for a web application for malicious C2 activity.

At block 403, the detection service begins analyzing subsets of network traffic data corresponding to each determined communication protocol. The subsets of network traffic data can correspond to DNS traffic, SSL/TLS traffic, and/or HTTP traffic, for example, At block 405, the detection service analyzes the subset of network traffic data corresponding to the communication protocol based on one more detection rules defined for the communication protocol. The rules have been defined for network traffic data of the communication protocol that corresponds to the web application. Rules can indicate one or more conditions based on which the subset of network traffic data is evaluated. For instance, the rules may indicate one or more API endpoints of the web application known to be associated with malicious C2 activity and/or bot activity. In this case, the detection service analyzes indications of API endpoints in the network traffic data subset to determine if any of the known API endpoints are indicated therein. As an illustrative example, for DNS network traffic data, a rule may indicate a check for whether the DNS traffic data comprise a DNS response (identified by the presence of a designated header flag indicated in the rule) that indicates an API endpoint of the web application that is maintained in a set of API endpoints known to be associated with bot/C2 activity (e.g., by querying a database with an API endpoint indicated in the DNS response(s), searching a data structure for an API endpoint indicated in the DNS response(s), etc.). Alternatively, or in addition, the rules may indicate one or more checks for particular data fields and/or message types of the network traffic data. As another illustrative example, for SSL/TLS traffic data, a rule may indicate a check for whether the SSL/TLS traffic data comprise a "client hello" message that indicates a SNI having a match in the set of known API endpoints. FIG. 6 depicts example operations for analyzing HTTP traffic data for malicious C2 activity based on detection rules defined for HTTP.

At block 407, the detection service determines if the detection rule(s) for the communication protocol is satisfied. If multiple rules are defined for the communication protocol, the detection service can determine that the rules for the communication protocol are satisfied if each of the rules are satisfied; in other words, determination that the detection rules are satisfied may be contingent on the condition in each rule being satisfied (e.g., evaluating to true). If the rule(s) of the communication protocol for detecting malicious C2 and/or bot activity are satisfied, operations continue at block 409. If no rules are satisfied, operations continue at block 411.

At block 409, the detection service indicates in results of the analysis that the network traffic data satisfy the detection rule(s) for the communication protocol. The detection service generates analysis results that indicate whether the subsets of network traffic data corresponding to each communication protocol are indicative of potential bot and/or C2 activity. The detection service may set a flag in the analysis results corresponding to the communication protocol, incrementing a counter corresponding to the communication protocol, etc. to indicate that the rule(s) was satisfied for the communication protocol.

At block 411, the detection service determines if there is another communication protocol for which to analyze the corresponding subset of network traffic data. If so, operations continue at block 403. Otherwise, operations are complete.

FIG. 5 is a flowchart of operations for analyzing network traffic data captured for a web application for detection of bot or C2 activity based on DNS and HTTPS traffic data. While FIG. 4 described a general case for analyzing network traffic data of different communication protocols for bot/C2 activity, FIG. 5 describes the analysis of DNS traffic data, SSL/TLS traffic data, and, if decryption of HTTPS traffic was enabled when the network traffic was captured, HTTP traffic data. Rules for additional and/or other communication protocols can be defined in implementations.

At block 501, the detection service determines if the network traffic data captured for an endpoint device indicate port 53 as a destination port. The determination of whether port 53 is indicated as a destination port informs whether the network traffic data comprise DNS traffic data. If the network traffic data indicate port 53 as a destination port, operations continue at block 502. Otherwise, operations continue at block 503.

At block 502, the detection service analyzes DNS traffic data captured for the endpoint device based on a rule(s) defined for DNS traffic data of the web application. An example of a rule defined for DNS traffic data of the web application is a rule indicating criteria that the network traffic data comprises a valid DNS response (e.g., one indicating a designated DNS response header flag) that indicates an API endpoint known to be associated with the web application (e.g., an API endpoint URL), where the rule is satisfied if the network traffic data satisfy these criteria.

At block 503, the detection service determines if the network traffic data indicate port 443 as a destination port. The determination of whether port 443 is indicated as a destination port informs whether the network traffic data comprise HTTPS traffic data. If the network traffic data indicate port 443 as a destination port, operations continue at block 504. Otherwise, operations continue at block 509.

At block 504, the detection service analyzes SSL/TLS traffic data captured for an endpoint device based on a rule(s) defined for SSL/TLS traffic data of the web application. An example of a rule defined for SSL/TLS traffic data of the web application is a rule indicating criteria that the network traffic data comprises a "client hello" message that comprises a SNI field with a value that matches a known API endpoint of the web application, where the rule is satisfied if the network traffic data satisfy these criteria.

At block 505, the detection service determines if the network traffic data are decrypted. The HTTPS traffic data may have been decrypted if the cybersecurity device (e.g., firewall) that captured the corresponding HTTPS traffic had an SSL/TLS decryption feature enabled and the cybersecurity device thus decrypted the HTTPS traffic. Depending on whether the detection service determines that the network traffic data are decrypted, the detection service may set a flag or value of a variable in generated analysis results that reflects whether the network traffic data are decrypted and the analysis of decrypted traffic data could thus be performed. If the network traffic data are decrypted, operations continue at block 507. Otherwise, operations continue at block 509.

At block 507, the detection service analyzes HTTP traffic data captured for the endpoint device based on a rule(s) defined for HTTP traffic data of the web application. Analysis of HTTP traffic data is described in further detail in reference to FIG. 6.

At block 509, the detection service generates a verdict based on results of the analysis. The detection service evaluates the results of the analysis to determine whether the network traffic data are indicative of bot activity or malicious C2 activity for the endpoint device (e.g., as described in reference to FIG. 3). For instance, the detection service may generate a verdict indicating that bot activity was detected if the rules for DNS and SSL/TLS traffic data were satisfied and the network traffic data were encrypted. The detection service may generate a verdict indicating that malicious C2 activity was detected if the network traffic data were decrypted and the rules for DNS and SSL/TLS traffic data were satisfied and/or one or more of the rules defined for HTTP traffic data were satisfied.

FIG. 6 is a flowchart of example operations for analyzing HTTP traffic data captured for a web application for malicious C2 activity. The detection service may be able to analyze HTTP traffic data if the obtained network traffic data were decrypted, such as if the cybersecurity appliance that mirrored the network traffic decrypted HTTPS traffic and captured (e.g., in a firewall log and/or packet capture file) the decrypted network traffic. The example operations assume that the network traffic data in which the HTTP traffic data are identified were determined to correspond to a web application such as a social media platform as described above. The example operations are an example approach for detecting C2 activity based on HTTP traffic data. Additional and/or different checks for HTTP traffic data can be performed in implementations, such as based on a maintained list of known malicious or suspicious commands.

At block 601, the detection service identifies one or more HTTP requests and one or more HTTP responses in the network traffic data. The detection service may filter the network traffic data to obtain the HTTP traffic data included therein.

At block 603, the detection service determines if the HTTP traffic data comprise a request that indicates a path. The detection service determines if any of the one or more HTTP requests indicates a URL that comprises a path. The detection service can analyze the HTTP request header(s) to determine if it indicates a URL with a path. If the HTTP traffic data comprise a request that indicates a URL with a path, operations continue at block 605. If there is no request that comprises a URL with a path, operations continue at block 609.

At block 605, the detection service determines the C2 activity(s) corresponding to the value(s) in the path(s). For each request that was determined to comprise a URL with a path, the detection service identifies the value of the URL path and evaluates it based on a maintained set of URL paths or patterns known to be associated with C2 activities carried out via the social media platform. The URL paths/patterns known to be associated with C2 activities have been previously identified, such as with expert knowledge and/or domain knowledge. Examples of C2 activities that can be identified based on HTTP requests include setting up bot communication via an API key, check-in, beaconing, and communication with the C2 server. Each of these C2 activities can have respective URL paths/patterns known to be associated therewith. To illustrate, for the example in which network traffic data corresponding to Telegram are analyzed for malicious C2 activity, the C2 activities associated with finding an API key used by a bot, check-in, beaconing, and communication with the C2 server can correspond to URL paths that comprise values of "/bot", "/getMe", "/getUpdates", and "/sendMessage", respectively. If multiple requests comprising a URL with a path were identified at block 603, the detection service can determine multiple corresponding C2 activities.

At block 607, the detection service indicates the determined C2 activity (ies) in analysis results. The detection service generates analysis results that it updates with evidence of C2 activity that it identifies, including the C2 activity (ies) identified in the HTTP traffic data. The detection service can set one or more flags in the analysis results being generated to indicate that each respective C2 activity was identified, for instance.

At block 609, the detection service determines if the HTTP traffic data comprise a response that includes a JSON object. One or more of the responses may include a JSON object in the response body that corresponds to a requested resource. The detection service can attempt to read JSON from the response(s) to determine if the response(s) includes a JSON object (e.g., based on whether the result of the read attempt is null). If the HTTP traffic data comprise a response that includes a JSON object, operations continue at block 611. Otherwise, operations continue at block 619.

At block 611, the detection service determines if the JSON object indicates a known malicious entity. Known malicious entities can include account names, usernames, and/or user identifiers known to be malicious. The detection service maintains or has access to indications of known malicious entities that are associated with the web application. For instance, the malicious entity name/identifier(s) may be stored in a database that the detection service can access or a data structure that the detection service maintains. The detection service can first determine if the JSON object comprises a username field, user identifier field, etc. and, if so, then performs a lookup for the username, user identifier, etc. in the indications of known malicious entities. The JSON object is determined to indicate a known malicious entity if the lookup yields a finding that a known malicious entity (e.g., a known malicious user identifier/username) is indicated in the JSON object. If the JSON object indicates a known malicious entity, operations continue at block 613. Otherwise, operations continue at block 615.

At block 613, the detection service indicates in the analysis results that a known malicious entity was found. The detection service can set a flag or increment a counter (e.g., a maliciousness counter initialized at 0) in the analysis results to indicate that the malicious entity was found for the HTTP traffic data corresponding to the endpoint device. The detection service may further record an indication of the known malicious entity in the analysis results.

At block 615, the detection service determines if the JSON object comprises a suspicious pattern. The detection service maintains or has access to suspicious data and/or text patterns that may be identified in JSON of an HTTP response. For instance, the suspicious patterns can be stored in a database or data structure as regular expressions. The detection service may also convert the JSON object to a string and determine whether the resulting string comprises a match to a suspicious pattern. As an example, suspicious patterns can be network address (e.g., IP address) patterns that would be expected to be identified in a data exfiltration attempt. If the JSON object comprises a suspicious pattern, operations continue at block 617. Otherwise, operations continue at block 619.

At block 617, the detection service indicates in the analysis results that a suspicious pattern was found. The detection service can set a flag or increment a counter in the analysis results to indicate that a suspicious pattern was found in the HTTP traffic data corresponding to the endpoint device. The detection service may further record an indication of the suspicious pattern for which the match was found in the analysis results.

At block 619, the detection service indicates the analysis results. Indicating the analysis results can include generating a report or notification, storing the analysis results, etc. The analysis results indicate whether any evidence of malicious C2 activity was found in the HTTP traffic data and may further indicate a verdict of maliciousness. As an example, the analysis results can comprise a counter that is incremented when evidence of malicious C2 activity is identified in the HTTP traffic data.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 305 to 323 can be performed at least partially in parallel or concurrently and/or in batches. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 7:
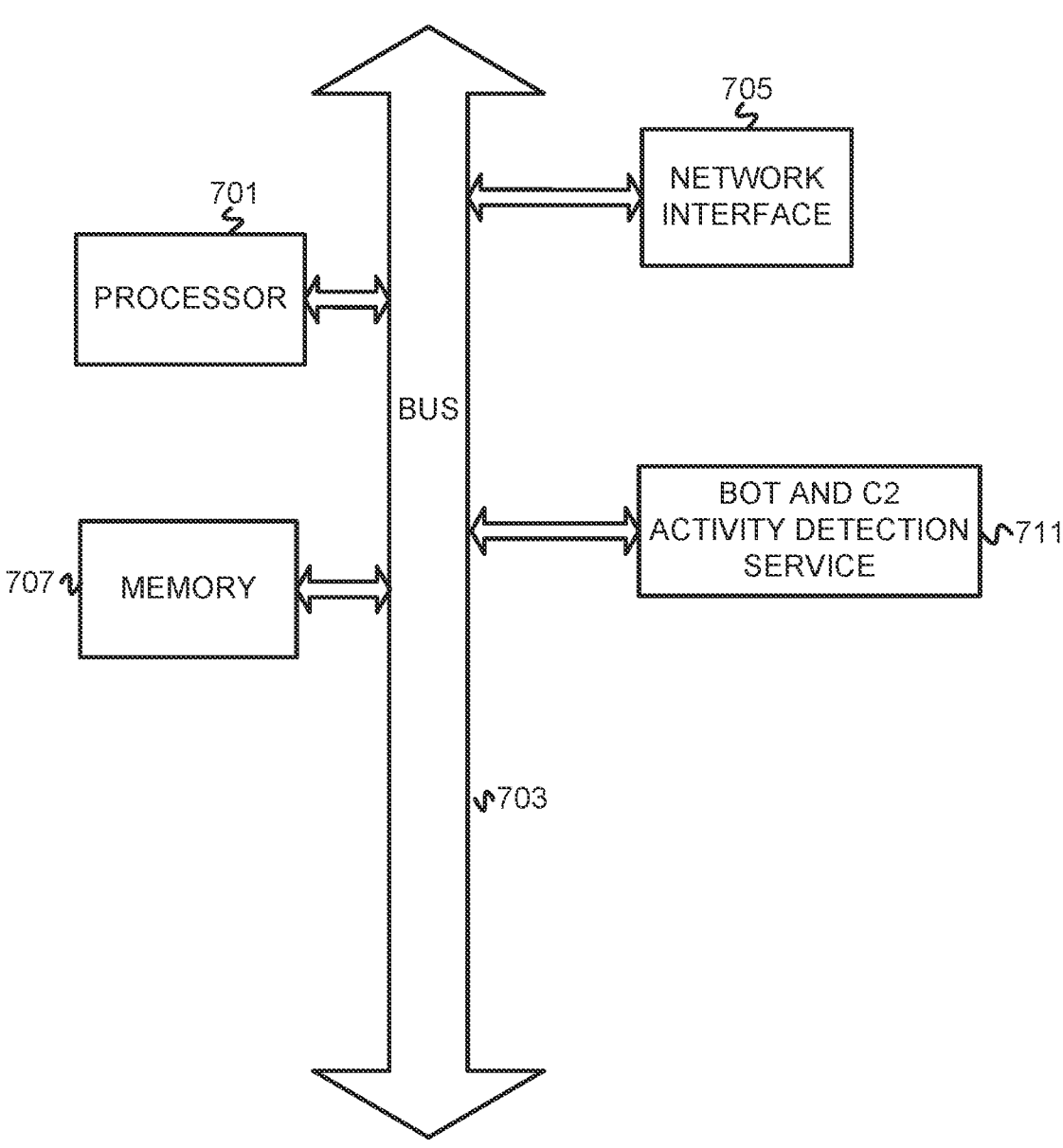
FIG. 7 depicts an example computer system with a bot and C2 activity detection service.

FIG. 7 depicts an example computer system with a bot and C2 activity detection service. The computer system includes a processor 701 (possibly including multiple processors, multiple cores, multiple nodes, and/or implementing multi-threading, etc.). The computer system includes memory 707. The memory 707 may be system memory or any one or more of the above already described possible realizations of machine-readable media. The computer system also includes a bus 703 and a network interface 705. The system also includes bot and C2 activity detection service 711. The bot and C2 activity detection service 711 analyzes network traffic captured for a web application (e.g., a social media platform) across multiple communication protocols for detection of bot and/or malicious C2 activity being carried out via infrastructure of the web application. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

The invention claimed is:

1. A method comprising:
obtaining network traffic data captured for a first device;
determining whether the network traffic data are decrypted;
based on determining that the network traffic data are associated with a first web application, evaluating subsets of the network traffic data based on corresponding ones of a plurality of rules defined for detecting at least one of bot activity and malicious command and control (C2) activity carried out via the first web application, wherein each of the plurality of rules corresponds to one of a plurality of communication protocols, and wherein the plurality of rules is determined based, at least in part, on whether the network traffic data are decrypted;
determining whether a first of the network traffic data indicate that the first device is affected by at least one of bot activity and malicious C2 activity carried out via the first web application based on determining whether the subsets of the network traffic data satisfy the corresponding ones of the plurality of rules; and
based on determining that the first device is affected by the at least one of bot activity and malicious C2 activity, indicating that the first device is affected by the at least one of bot activity and malicious C2 activity carried out via the first web application.

2. The method of claim 1, wherein determining that the network traffic data are associated with a first web application comprises determining that the network traffic data are associated with a social media platform, and wherein the plurality of rules defined for detecting at least one of bot activity and malicious C2 activity carried out via the first web application comprise rules for detecting at least one of bot activity and malicious C2 activity carried out via the social media platform.

3. The method of claim 1, wherein evaluating the subsets of the network traffic data based on corresponding ones of the plurality of rules comprises evaluating a first subset of the network traffic data corresponding to Domain Name System (DNS) traffic data based on a first rule of the plurality of rules defined for DNS traffic and evaluating a second subset of the network traffic data corresponding to Secure Sockets Layer (SSL)/Transport Layer Security (TLS) traffic data based on a second rule of the plurality of rules defined for SSL/TLS traffic.

4. The method of claim 3 further comprising determining that the first subset of the network traffic data satisfy the first rule based on determining that the first subset of the network traffic data comprise a DNS response that indicates an application programming interface (API) endpoint included in a set of one or more known API endpoints.

5. The method of claim 3 further comprising determining that the second subset of the network traffic data satisfy the second rule based on determining that the second subset of the network traffic data comprise a client hello message with a Server Name Indication (SNI) that is included in a set of one or more known API endpoints.

6. The method of claim 3, wherein determining that the first device is affected by at least one of bot activity and malicious C2 activity comprises, based on determining that the network traffic data are not decrypted, determining that the first de vice is affected by bot activity based on determining that the first and second subsets of the network traffic data satisfy the corresponding ones of the first and second rules.

7. The method of claim 1, wherein evaluating the subsets of the network traffic data based on corresponding ones of the plurality of rules comprises, based on determining that the network traffic data are decrypted, evaluating a third subset of the network traffic data corresponding to Hypertext Transfer Protocol (HTTP) traffic data based on a third rule of the plurality of rules defined for HTTP traffic.

8. The method of claim 7 further comprising determining that the third subset of the network traffic data satisfy the third rule based on determining that the third subset of the network traffic data comprise at least one of a known malicious account name associated with the first web application, a known malicious user identifier associated with the first web application, and a known malicious text pattern.

9. The method of claim 7, wherein determining that the first device is affected by at least one of bot activity and malicious C2 activity comprises determining that the first device is affected by malicious C2 activity based on determining that the third subset of the network traffic data satisfy the third rule.

10. One or more non-transitory machine-readable media having program code stored thereon, the program code comprising instructions to:

obtaining network traffic data captured for a first device;
determine whether network traffic data captured for a first device are decrypted;
based on a determination that the network traffic data correspond to a first web application, evaluate subsets of the network traffic data based on corresponding ones of a plurality of rules defined for detecting at least one of bot activity and malicious command and control (C2) activity carried out via the first web application, wherein each of the plurality of rules corresponds to one of a plurality of communication protocols, and wherein the plurality of rules is determined based, at least in part, on a determination of whether the network traffic data are decrypted;

determine whether a first of the network traffic data indicate that the first device is affected by at least one of bot activity and malicious C2 activity carried out via the first web application based on a determination of whether the subsets of the network traffic data satisfy the corresponding ones of the plurality of rules; and based on a determination that the first device is affected by the at least one of bot activity and malicious C2 activity, indicate that the first device is affected by the at least one of bot activity and malicious C2 activity carried out via the first web application.

11. The non-transitory machine-readable media of claim 10, wherein the first web application is a social media platform, and wherein the plurality of rules defined for detecting at least one of bot activity and malicious C2 activity carried out via the first web application comprise rules for detecting the at least one of bot activity and malicious C2 activity carried out via the social media platform.

12. The non-transitory machine-readable media of claim 10, wherein the instructions to evaluate the subsets of the network traffic data based on corresponding ones of the plurality of rules comprise instructions to:

evaluate a first subset of the network traffic data corresponding to Domain Name System (DNS) traffic data based on a first rule of the plurality of rules defined for DNS traffic; and evaluate a second subset of the network traffic data corresponding to Secure Sockets Layer (SSL)/Transport Layer Security (TLS) traffic data based on a second rule of the plurality of rules defined for SSL/TLS traffic.

13. The non-transitory machine-readable media of claim 12, wherein the instructions to determine that the first device is affected by at least one of bot activity and malicious C2 activity comprise instructions to, based on a determination that the network traffic data are not decrypted, determine that the first device is affected by bot activity based on a determination that the first and second subsets of the network traffic data satisfy the corresponding ones of the first and second rules.

14. The non-transitory machine-readable media of claim 10, wherein the instructions to evaluate the subsets of the network traffic data based on corresponding ones of the plurality of rules comprise instructions to, based on a determination that the network traffic data are decrypted, evaluate a third subset of the network traffic data corresponding to Applicant/Assignee Palo Alto Networks, Inc Hypertext Transfer Protocol (HTTP) traffic data based on a third rule of the plurality of rules defined for HTTP traffic.

15. The non-transitory machine-readable media of claim 14, wherein the instructions to determine that the first device is affected by at least one of bot activity and malicious C2 activity comprise instructions to determine that the first device is affected by malicious C2 activity based on determining that the third subset of the network traffic data satisfy the third rule.

16. An apparatus comprising:
a processor; and
a machine-readable medium having instructions stored thereon that are executed by the processor to cause the apparatus to:

obtain network traffic data captured for a first device for a first web application, wherein the network traffic data correspond to a plurality of communication protocols;

analyze the network traffic data for evidence of bot activity based on first rules defined for detection of bot activity carried out via the first web application and a first set of communication protocols to which the network traffic data correspond;

based on a determination that the network traffic data comprise decrypted network traffic data, analyze the network traffic data for evidence of malicious command-and-control (C2) activity based on second rules defined for detection of malicious C2 activity carried out via the first web application and a second set of communication protocols to which the network traffic data correspond; and indicate that the first device is affected by at least one of bot activity and malicious C2 activity carried out via the first web application based on results of analysis of the network traffic data.

17. The apparatus of claim 16, wherein the instructions executed by the processor to cause the apparatus to analyze the network traffic data for evidence of bot activity comprise instructions executed by the processor to cause the apparatus to:

evaluate a first subset of the network traffic data corresponding to Domain Name System (DNS) traffic data based a respective one of the first rules defined for DNS traffic; and evaluate a second subset of the network traffic data corresponding to Secure Sockets Layer (SSL)/Transport Layer Security (TLS) traffic data based on a respective one of the first rules defined for SSL/TLS traffic.

18. The apparatus of claim 17, wherein the instructions executed by the processor to cause the apparatus to indicate that the first device is affected by at least one of bot activity and malicious C2 activity comprise instructions to indicate that the first device is affected by bot activity based on a determination that the first and second subsets of the network traffic data satisfy the corresponding ones of the first rules.

19. The apparatus of claim 16, wherein the instructions to analyze the network traffic data for evidence of malicious C2 activity comprise instructions to evaluate a third subset of the network traffic data corresponding to Hypertext Transfer Protocol (HTTP) traffic data based on a respective one of the second rules defined for HTTP traffic.

20. The apparatus of claim 19, wherein the instructions executed by the processor to cause the apparatus to indicate that the first device is affected by at least one of bot activity and malicious C2 activity comprise instructions executed by the processor to cause the apparatus to indicate that the first device is affected by the malicious C2 activity based on a determination that the third subset of the network traffic data satisfy the respective one of the second rules.

\* \* \* \* \*